United States Patent
Nakamura et al.

(10) Patent No.: US 7,026,725 B2
(45) Date of Patent: Apr. 11, 2006

(54) CONTROL CIRCUIT FOR VEHICULAR POWER TRANSMISSION APPARATUS, AND ABNORMALITY DETERMINING DEVICE FOR THE CONTROL CIRCUIT

(75) Inventors: Takeshi Nakamura, Tokyo (JP); Atsushi Kumazawa, Kanagawa (JP); Osamu Ogi, Kanagawa (JP); Osamu Umemoto, Kanagawa (JP)

(73) Assignee: Mitsutishi Fuso Truck and Bus Corporation, Tokyo (JP)

( * ) Notice: Subject to any disclaimer, the term of this patent is extended or adjusted under 35 U.S.C. 154(b) by 477 days.

(21) Appl. No.: 10/305,235

(22) Filed: Nov. 27, 2002

(65) Prior Publication Data

US 2003/0125861 A1 Jul. 3, 2003

(30) Foreign Application Priority Data

Nov. 28, 2001 (JP) ............................. 2001-363262

(51) Int. Cl.
*H02H 7/00* (2006.01)
(52) U.S. Cl. ........................................ 307/10.1; 701/51
(58) Field of Classification Search ........ 307/10.1–9.1; 192/3.51–3.63; 340/438; 701/51
See application file for complete search history.

(56) References Cited

U.S. PATENT DOCUMENTS

| | | | | |
|---|---|---|---|---|
| 3,628,642 A | * | 12/1971 | Ravenel | 477/81 |
| 3,805,640 A | * | 4/1974 | Schneider et al. | 477/56 |
| 4,771,755 A | * | 9/1988 | Asakura et al. | 123/686 |
| 5,790,969 A | * | 8/1998 | McKee | 701/51 |
| 6,163,082 A | * | 12/2000 | Yoshida et al. | 307/10.1 |
| 6,653,745 B1 | * | 11/2003 | Masaki et al. | 307/10.1 |

* cited by examiner

*Primary Examiner*—Lynn Feild
*Assistant Examiner*—Michael Rutland-Wallis
(74) *Attorney, Agent, or Firm*—Birch, Stewart, Kolasch & Birch, LLP

(57) ABSTRACT

An interruption circuit capable of interrupting an electrical power fed from a power source unit to a driver circuit in response to an interruption signal from an electronic control unit is interposed between the driver circuit for activating power transmission means and the power source unit. By this arrangement, it is possible to interrupt the electrical power fed from the power source unit to the driver circuit forcibly and prevent unnecessary power consumption and unnecessary action (or a malfunction) of the power transmission means.

11 Claims, 6 Drawing Sheets

US 7,026,725 B2

CONTROL CIRCUIT FOR VEHICULAR POWER TRANSMISSION APPARATUS, AND ABNORMALITY DETERMINING DEVICE FOR THE CONTROL CIRCUIT

CROSS REFERENCE TO RELATED APPLICATION

This non-provisional application claims priority under 35 U.S.C. §109(a) on Patent Application No. 2001-363262 filed in Japan on Nov. 28, 2001, which is herein incorporated by reference.

BACKGROUND OF THE INVENTION

1. Field of the Invention

The present invention relates to a control circuit for controlling a gear-shift unit for shifting a mechanical-type automatic transmission or a clutch control unit for applying/releasing a clutch interposed between an engine and the mechanical-type automatic transmission, and also to an abnormality determining device for the control circuit.

2. Description of the Related Art

As a transmission for an automobile, there has been a mechanical-type automatic transmission, which is provided with a speed-changing gear mechanism and a clutch mechanism similar to those of a manual transmission, an actuator (or a gear-shift unit) for driving the speed-changing gear mechanism and an actuator (or a clutch control unit) for driving the clutch mechanism, and an electronic control unit (ECU) for controlling those individual actuators. This mechanical-type automatic transmission has been centrally applied to a large-sized vehicle such as a truck or a bus.

Here, in a vehicle equipped with an air pump, the gear-shift unit can be constructed with actuators using pneumatic pressure. In a vehicle not equipped with an air pump, however, it is more advantageous in terms of the mounting space and cost by utilizing electric actuators rather than providing a new air pump.

In the case of the clutch control unit, it is also more advantageous to utilize electric actuators which in combination with an electric pump for producing a fluid pressure or an electric motor.

In the case of the mechanical-type automatic transmission having such electric actuators, a structure, as shown in FIG. 7, can be generally considered. More specifically, as shown in FIG. 7, a driver circuit 33 for controlling operations of a gear-shift unit 31 and a driver circuit 23 for controlling operations of a clutch control unit 21 are integrated, and that the driver circuits 33 and 23 are connected via signal lines 81 and 82 with an ECU 41 for controlling those actuators 31 and 21.

On the other hand, electric current for driving the gear-shift unit 31 or the clutch control unit 21 has to be fed from a battery 70 through the driver circuits 33 and 23 to the gear-shift unit 31 or the clutch control unit 21. It is, therefore, necessary to provide a power feeding harness (or a power feed line) 73 from the battery 70 mounted on the chassis side to the driver circuits 33 and 23 to provide power feeding harnesses (or power feed lines) 74 and 75 from the driver circuits 33 and 23 to the gear-shift unit 31 and the clutch control unit 21 mounted on the chassis side.

The driver circuits 33 and 23 are arranged apart from the ECU 41, as described above, for the following reasons.

The actuators, such as the gear-shift unit 31 and the clutch control unit 21, are disposed in the vicinity of an engine, which has a high temperature and a serious vibration. This is not a suitable environment for the ECU 41. Therefore, the ECU 41 is arranged apart from the gear-shift unit 31 and the clutch control unit 21.

Moreover, the actuators, such as the gear-shift unit 31 and the clutch control unit 21, have to be fed with a large current so that a large capacity electric wires for the large current have to be used as the harnesses 73, 74, and 75. To suppress increase in cost and weight, therefore, it is effective to reduce the lengths of the harnesses 73, 74, and 75. The lengths of these harnesses 73, 74, and 75 can be reduced, if the driver circuits 33 and 23 are arranged apart from the ECU 41 and close to the gear-shift unit 31, the clutch control unit 21, and the battery 70.

However, in a system where an electric actuator utilizing the electric motor or the like, or a solenoid valve is adopted in the gear-shift unit or the clutch control unit, the following problems occur if the driver circuits 33 and 23 for driving the electric motor or the solenoid valve are separated from the ECU 41 and arranged near the battery 70 so that the drive power may be taken directly from the battery.

In case any abnormality occurs in the system, a malfunction may be caused despite no drive signal is provided from the ECU, and the vehicle may exhibit unexpected behaviors.

If a minute current flows in the drive signal line when the engine key is OFF, the battery may be exhausted by the malfunction of or the power consumption by the actuator.

SUMMARY OF THE INVENTION

The present invention contemplates to solve such problems and provides a control circuit structure of a mechanical-type automatic transmission, which utilizes electric devices as a gear-shift unit and a clutch control unit and which is enabled to prevent the malfunction of the electric devices or unnecessary consumption of a power source by disposing an electronic control unit at a portion of a better environment spaced from the gear-shift unit or the clutch control unit and by making an electric wire for a large current as short as possible to reduce cost and weight.

According to the present invention, there is provided a control circuit abnormality determining device for a vehicular power transmission apparatus, which comprises: a power transmission unit for transmitting a driving force of an engine to an output member; an actuator for switching actions of said power transmission unit; a driver circuit for driving said actuator; a power source unit for feeding an electric power to said driver circuit; an interruption unit capable of interrupting power feed from said power source unit to said driver circuit selectively; an electronic control unit for outputting a drive signal to said driver circuit and an interruption signal to said interruption unit; and an abnormality determining unit for determining an abnormality of the power feed to said driver circuit on the basis of presence/absence of the output of said interruption signal and the presence/absence of the power feed to said driver circuit.

On the basis of the presence/absence of the output of the interruption signal to be outputted from the electronic control unit to the interruption unit and the presence/absence of the power feed from the power source unit to the driver circuit, it is possible to determine the unexpected abnormality of the power feed to the driver circuit or the abnormality of the disconnection of the power feed circuit from the power source unit to the driver circuit, thereby to prevent the malfunction of the actuator.

DETAILED DESCRIPTION OF THE PRESENT INVENTION

The embodiments of the present invention will be described in detail with reference to the accompanying drawings.

A first embodiment of the invention will be described with reference to the drawings.

Figure 1:
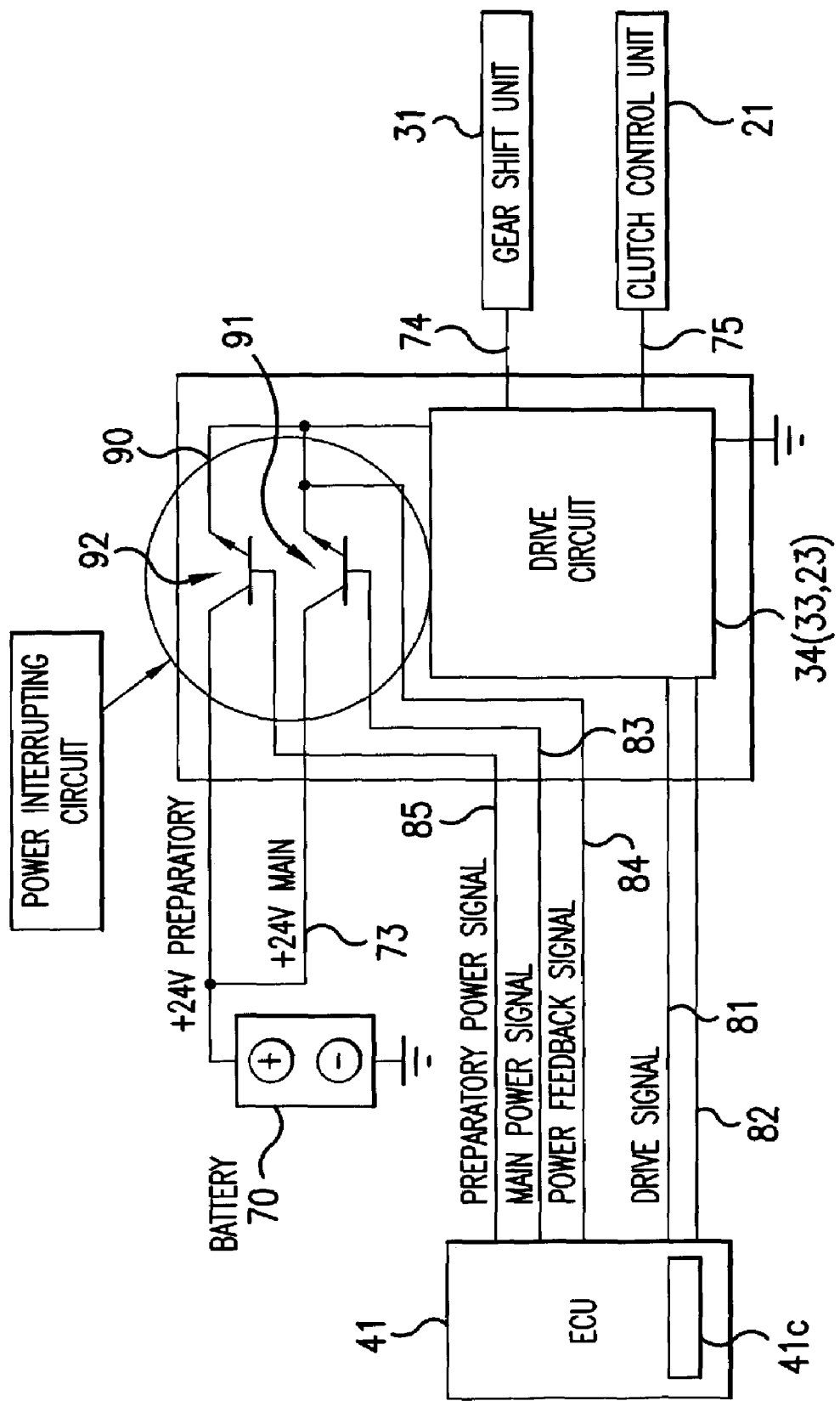
FIG. 1 is a schematic construction diagram showing a control circuit structure of a mechanical-type automatic transmission according to a first embodiment of the present invention.
Figure 2:
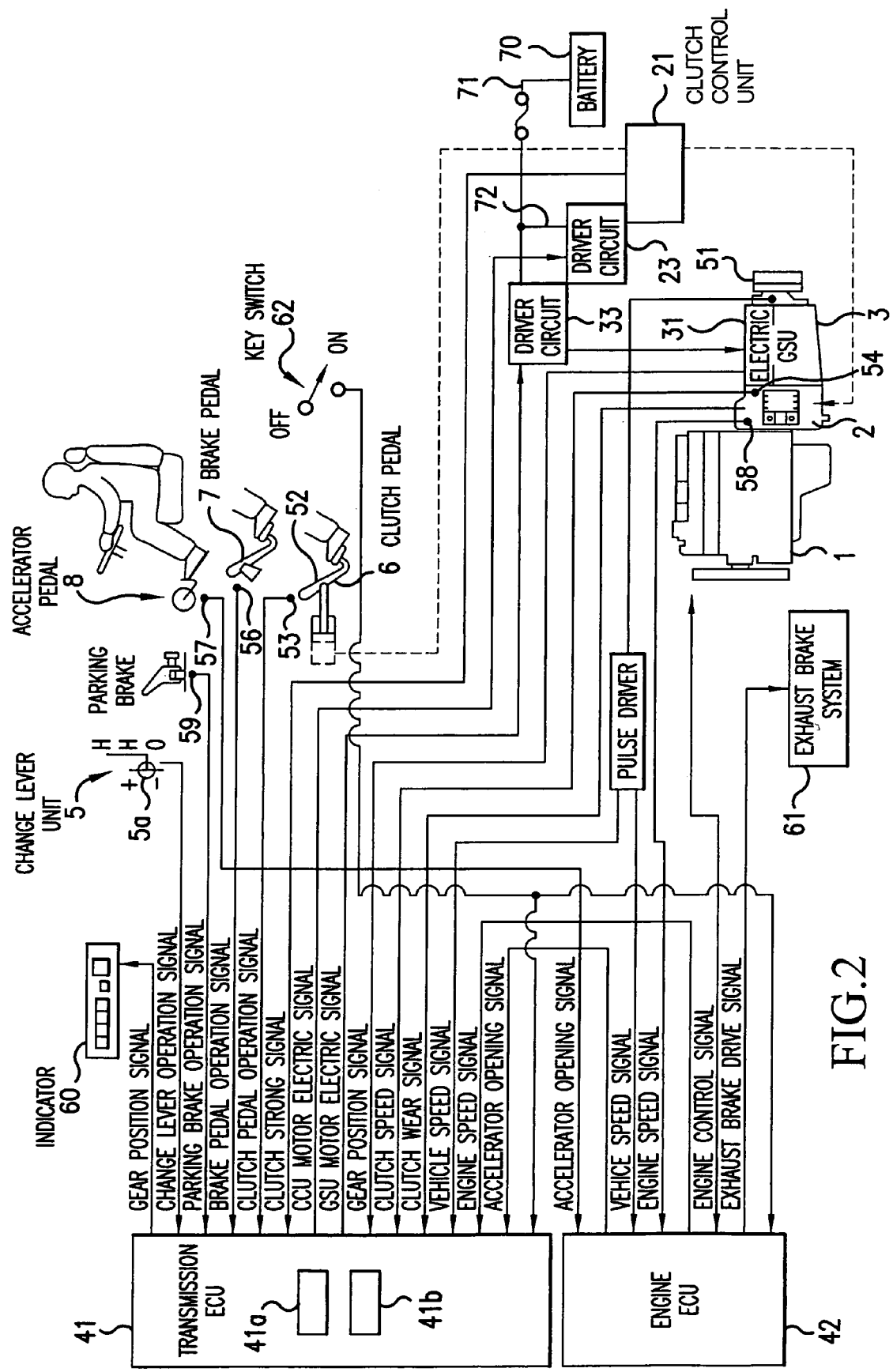
FIG. 2 is a construction diagram showing a drive system of an automobile equipped with a mechanical-type automatic transmission according to the individual embodiments of the invention.
Figure 3:
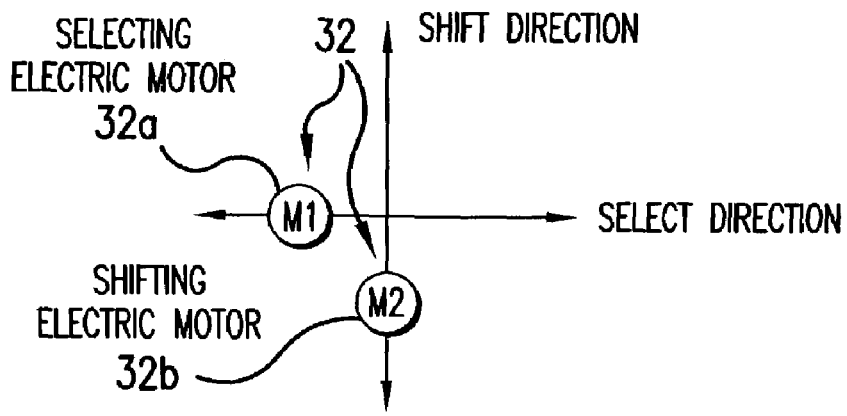
FIG. 3 is a diagram showing a gear-shift unit according to the control circuit structure of the individual embodiments of the invention.
Figure 4:
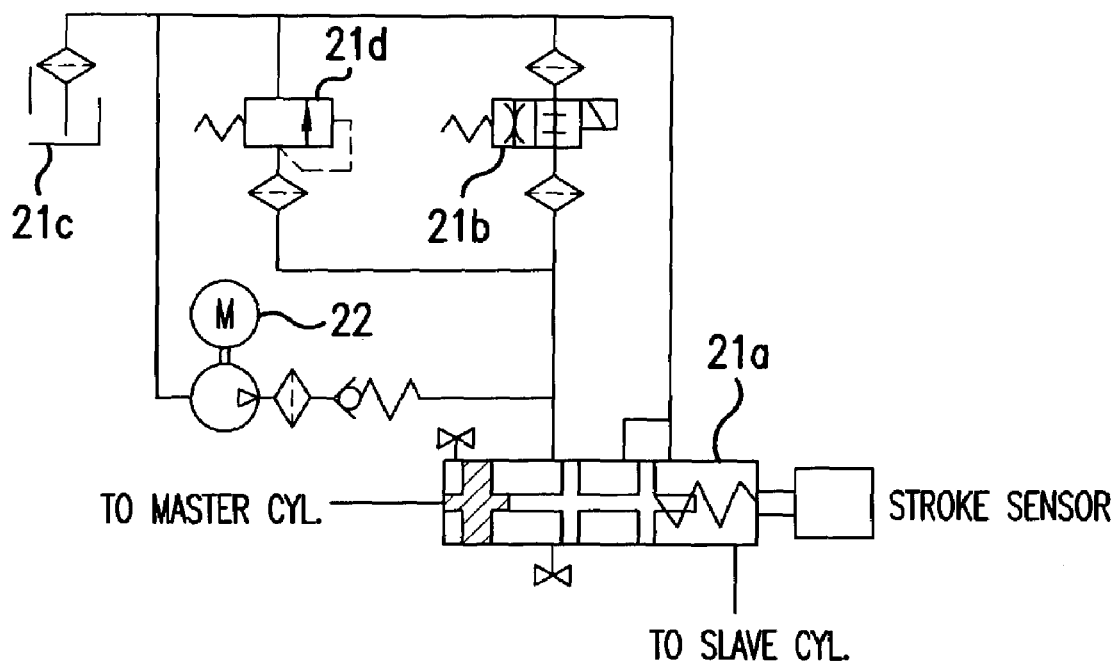
FIG. 4 is a diagram showing a clutch control unit according to the control circuit structure of the individual embodiments of the invention.

FIG. 1 is a diagram showing a control circuit structure of a mechanical-type automatic transmission according to the first embodiment of the present invention; FIG. 2 is a diagram showing a drive system of an automobile equipped with a mechanical-type automatic transmission according to the individual embodiments of the invention; FIG. 3 is a diagram showing a gear-shift unit according to the control circuit structure; and FIG. 4 is a diagram showing a clutch control unit according to the control circuit structure.

First of all, the mechanical-type automatic transmission according to the embodiment is attached to an engine 1 mounted on an automobile (e.g., a truck provided with a cab on a chassis), as shown in FIG. 2. The automobile is provided with a clutch mechanism (as simply called "a clutch") 2 attached to the output portion of the engine 1 and having a friction clutch, and a mechanical-type automatic transmission body 3 connected to that clutch mechanism 2 to the output portion of the engine 1.

Moreover, the clutch mechanism 2 is selectively connected or disconnected by a clutch control unit (or a clutch booster) 21 acting as a clutch actuator. The clutch control unit 21 is provided with an electric pump 22 such as an electric actuator, as shown in FIG. 4, such that the clutch mechanism 2 selectively is connected or disconnected by feeding the not-shown master cylinder or a slave cylinder through a control valve 21a with a fluid pressure (or oil pressure) produced by the electric pump 22. Here, the control valve 21a is driven through a solenoid selector valve 21b. Moreover, the oil pressure is fed from a working oil tank 21c and regulated to a predetermined pressure by a control valve 21d.

The transmission body 3 is shifted by a gear-shift unit (GSU) 31 acting as a gear-shifting actuator. This gear-shift unit 31 is provided, for example, with an electric motor 32a for driving the gear-shift member in a select direction, and an electric motor 32b (both electric motors have been designated by reference numeral 32 hereinafter, although not discriminated) for driving the gear-shift member in a shift direction, as shown in FIG. 3, such that it is constructed as an electric actuator. At the time of a speed change, moreover, the gear position is shifted to a desired state by driving a desired portion with the electric motor 32 to switch the meshing state of the gear mechanism of the transmission body 3.

The engine 1 is controlled by drive signals from an engine electronic control unit (or engine ECU) 42, and the clutch control unit 21 and the gear-shift unit 31 are controlled with drive signals from a transmission electronic control unit (or transmission ECU) 41 or an electronic control unit for the transmission.

Moreover, this mechanical-type automatic transmission can select and execute a manual mode, in which a shift command of the gear position by the manual control of a driver is sent as an electric signal to the clutch control unit 21 and the gear-shift unit 31 thereby to control the control circuit unit 21 and the gear-shift unit 31 remotely, and an automatic shift mode, in which the actions of the clutch control unit 21 and the gear-shift unit 31 are controlled when the switching of the gear position is necessary for an optimum gear speed according to the running state (e.g., the vehicle speed or the engine load) of the vehicle.

Therefore, the transmission ECU 41 is provided with a manual shift remote operation control unit 41a for a manual shift control by a remote operation in a manual shift mode, and an automatic shifting remote operation control unit 41b for an automatic shift control in an automatic shift mode by controlling the clutch releasing operation, the gear-shift operation, and the clutch engaging operation.

The transmission ECU 41 is connected individually with: a change lever unit 5 that functions as shift operation means and manual/automatic select operation means; a vehicle speed sensor (acting as vehicle speed detecting means) 51 for detecting the speed of the vehicle; a clutch stroke sensor 52; a clutch switch 53 for detecting the depression of a clutch pedal 6; a transmission gear sensor (not shown) for detecting the gear position of the transmission body 3; a clutch speed sensor (acting as clutch output rotation detecting means) 54 for detecting the clutch rotation speed (i.e., the output side speed of the clutch mechanism 2); a stop lamp switch (including the type which detects the air pressure of a brake) 56 that is turned ON, when a brake pedal 7 is depressed, for detecting an operation of the brake; an emergency switch (not shown); an indicator 60; a parking brake switch 59; a key switch 62; and so on, so that it inputs various kinds of signals (as referred to FIG. 2).

On the other hand, the engine ECU 42 is connected individually with the key switch 62; the vehicle speed sensor 51; an accelerator depression sensor 57; an engine speed sensor 58; the transmission ECU 41; an exhaust brake system 61; and so on. Here, the accelerator depression sensor 57 is attached to an accelerator pedal 8.

When the manual shift mode is selected through the change lever unit 5, moreover, either only the gear-shift unit 31 or both the gear-shift unit 31 and the clutch control unit 21 are remotely controlled on the basis of the command from the change lever unit 5 through the manual shifting remote operation control unit 41a disposed in the transmission ECU 41.

In short, in the manual shifting remote operation control unit 41a, the operations for the clutch disengagement, the gear change, and the clutch engagement are controlled in the manual shift mode merely by operating a change lever 5a of the change lever unit 5 to operate the gear-shift unit 31 and the clutch control unit 21 manually while driving the essential portion of the transmission body 3 and the clutch mechanism 2.

When the automatic shift mode is selected through the change lever 5a, on the other hand, the automatic shift mode is executed. In this automatic shift mode, the gear-shift unit 31 and the clutch control unit 21 are remotely operated on the basis of the various kinds of information through the automatic transmission remote operation control unit 41b disposed in the transmission ECU 41, and the engine 1 is controlled by the engine ECU 42 on the basis of the various kinds of information.

Here will be noted the drive system for the gear-shift unit 31 and the clutch control unit 21. As shown in FIG. 1, the gear-shift unit 31 is provided with a gear-shifting driver circuit 33 for driving the electric motor 32 or the like, and the clutch control unit 21 is provided with a clutch controlling driver circuit 23 for driving the electric pump 22 or the like.

In the control circuit structure of the embodiment, the gear-shifting driver circuit 33 and the clutch controlling driver circuit 23 are integrated into an integral driver circuit 34. In other words, this integral driver circuit 34 has the functions of the gear-shifting driver circuit 33 and the clutch controlling driver circuit 23.

The electric motor 32 of the gear-shift unit 31, the electric pump 22 of the clutch control unit 21 and so on are activated when properly fed, through the integral driver circuit 34 (including the gear-shifting driver circuit 33 and the clutch controlling driver circuit 23), with an electric power from a battery (or the power source unit) 70 mounted on the vehicle. Therefore, a harness (e.g., a power feed line or an electric line) 73 is provided between the battery 70 and the integral driver circuit 34, a harness (e.g., a power feed line or an electric line) 74 is provided between the integral driver circuit 34 and the gear-shift unit 31 having the electric motor 32 and so on; and a harness (e.g., a power feed line or an electric line) 75 is provided between the integral driver circuit 34 and the clutch control unit 21 having the electric pump 22 and so on.

On the other hand, the battery 70 is disposed on the chassis side together with the gear-shift unit 31 having the electric motor 32 and so on and the clutch control unit 21 having the electric pump 22 and so on, and the integral driver circuit 34 is also disposed on the chassis side. Therefore, the power feed circuit including the battery 70, the integral driver circuit 34, the gear-shift unit 31, and the clutch control unit 21, is disposed as a whole on the chassis side so that the harnesses 73 to 75 can be provided via the short routes only on the chassis side. Of course, the integral driver circuit 34 is arranged near the gear-shift unit 31 and the clutch control unit 21 so that it is arranged spaced apart from the battery 70.

On the other hand, the transmission ECU (or the electronic control unit) 41 is disposed on the cab side where the environments thereof are better in terms of temperature and vibration than at the chassis side. Therefore, the integral driver circuit 34 and the transmission ECU 41 are disposed largely spaced apart from each other. The integral driver circuit 34 and the transmission ECU 41 are connected through signal lines 81 and 82, and the essential portion of the gear-shift unit 31 is activated by sending the command signal from the transmission ECU 41 via the signal line 81. Likewise, the essential portion of the clutch control unit 21 is activated by sending the drive signal from the transmission ECU 41 via the signal line 82.

With this construction, in which the driver circuit 34 is separated from the ECU 41 and arranged on the side of the clutch control unit 21 or the battery 70 so that the drive power source is taken directly from the battery, a malfunction may occur without any drive signal from the ECU such that the vehicle may exhibit an unexpected behavior, if any abnormality occurs in the system.

In this control circuit, therefore, an electrical connection by the harness 73 provided between the battery 70 and the integral driver circuit 34 can be interrupted by the ECU 41. In the harness 73, more specifically, a transistor (acting as gear-shifting power interrupting means and clutch controlling power interrupting means) 91 is incorporated to function as a switch, and signal lines 83 and 84 are connected between the ECU 41 and the transistor 91 and between the harness 73 and the ECU 41, respectively.

As a result, the ECU 41 can set the harness 73 in a conductive state, if a main power signal (interruption signal) is sent via the signal line 83 to the transistor 91, but can set the harness 73 in an insulated state if the main power signal is not sent. Here, the ECU 41 sends the main power signal normally to set the harness 73 in the conductive state, if the key switch 62 of the engine is ON, but does not send the main power signal to set the harness 73 in the insulated state, if the key switch 62 is OFF.

These setting operations are conducted to prevent the situation, in which a minute current may flow to the harness (or the drive signal line) 73 while the engine is being stopped, so that the electric actuator (including the gear-shift unit 31 and the clutch control unit 21) may cause a malfunction, and to prevent the electric power of the battery 70 reliably from being unnecessarily consumed by such a malfunction.

Moreover, the ECU 41 has a function (acting as malfunction determining means) 41c to determine a disorder (or malfunction) of the power feed circuit such as the harness 73 by monitoring a power feedback signal from the harness 73 via the signal line 84. If the electric power is fed from the battery 70 to the integral driver circuit 34 via the harness 73 although the main power signal is not sent from the ECU 41, for example, the malfunction determining means 41c can determine that the electric power is unnecessarily fed so that the power feed circuit has malfunctioned. If the electric power is not fed from the battery 70 to the integral driver circuit 34 via the harness 73 although the main power signal is sent from the ECU 41, on the contrary, the malfunction determining means 41c can determine that the power feed circuit has made a disconnection or an imperfect contact.

As stated in the foregoing, in preparation for a case in which the power feed circuit (or the main power feed circuit) such as the harness 73 fails, a preparatory harness (or a preparatory power feed circuit) 90 is provided between the battery 70 and the integral driver circuit 34 and in parallel with the harness 73. Also in this preparatory harness 90, a transistor (acting as gear-shifting power interrupting means and clutch controlling power interrupting means) 92, functioning as a switch, is incorporated, and a signal line 85 is interposed between the ECU 41 and the transistor 92.

The ECU 41, therefore, can set the harness 90 in an electrically conductive state, if a preparatory power signal (interruption signal) is sent to the transistor 92 via the signal line 85, but can set the harness 90 in an insulated state if the preparatory power signal is not sent.

Here, the ECU 41 does not send the preparatory power signal to the transistor 92 to set the harness 90 in the insulated state, at an ordinary time when the main power feed circuit such as the harness 73 is normal, so that it can determine that the main power feed circuit such as the harness 73 has failed. When the engine key switch 62 is ON, moreover, the ECU 41 interrupts the transmission of the main power signal to the transistor 91 and sends the preparatory power signal to the transistor 92 thereby to set the harness 73 in the insulated state and to set the harness 90 in the conductive state.

The control circuit structure of the mechanical-type automatic transmission according to the first embodiment of the invention is constructed, as has been described hereinbefore. At an ordinary time, therefore, the ECU 41 sends the main power signal to the transistor 91, when the key switch 62 of the engine is turned ON, to energize the main power feed circuit such as the harness 73 or the like. At this time, the preparatory power signal is not sent to the transistor 92, but the preparatory power feed circuit such as the harness 90 interrupts the power feed.

As a result, the integral driver circuit 34 is activated by the drive signals from the ECU 41 via the signal lines 81 and 82, to drive the gear-shift unit 31 and the clutch control unit 21 by using the electric power fed from the battery 70 through the main power feed circuit such as the harness 73.

When the key switch 62 of the engine is turned OFF, on the other hand, the ECU 41 interrupts the sending of the main power signal to the transistor 91 thereby to interrupt the power feed of the main power feed circuit such as the harness 73.

As a result, it is possible to prevent the situation, in which the minute current may flow into the harness (or the drive signal line) 73 when the engine is being stopped, so that the electric actuator (including the gear-shift unit 31 and the clutch control unit 21) cause a malfunction, and to prevent the electric power of the battery 70 reliably from being unnecessarily consumed by such a malfunction.

Moreover, the ECU 41 monitors the power feedback signal at all times from the harness 73 via the signal line 84. The ECU 41 interrupts the transmission of the main power signal to the transistor 91, when it detects the malfunction of the power feed circuit such as the harness 73, to set the harness 73 in the OFF state, and sends the preparatory power signal to the transistor 92, when the engine key switch 62 is ON, but does not send the preparatory power signal when the engine key switch 62 is OFF.

Even if the main power feed circuit such as the harness 73 fails, therefore, the integral driver circuit 34 is enabled by using the preparatory power feed circuit such as the normal harness 90 or the like to drive the gear-shift unit 31 and the clutch control unit 21 properly.

When the key switch 62 of the engine is turned OFF, the power feed to the preparatory power feed circuit 90 is interrupted so that the malfunction of the electric actuator (e.g., the gear-shift unit 31 or the clutch control unit 21) while the engine is being stopped can be reliably prevented to prevent the unnecessary consumption of the electric power of the battery 70 reliably.

Moreover, the gear-shifting driver circuit 33 and the clutch controlling driver circuit 23 are integrally constructed as the integral type driver circuit 34 so that the circuit construction can be made compact.

Next, a second embodiment of the present invention will be described with reference to the accompanying drawing.

Figure 5:
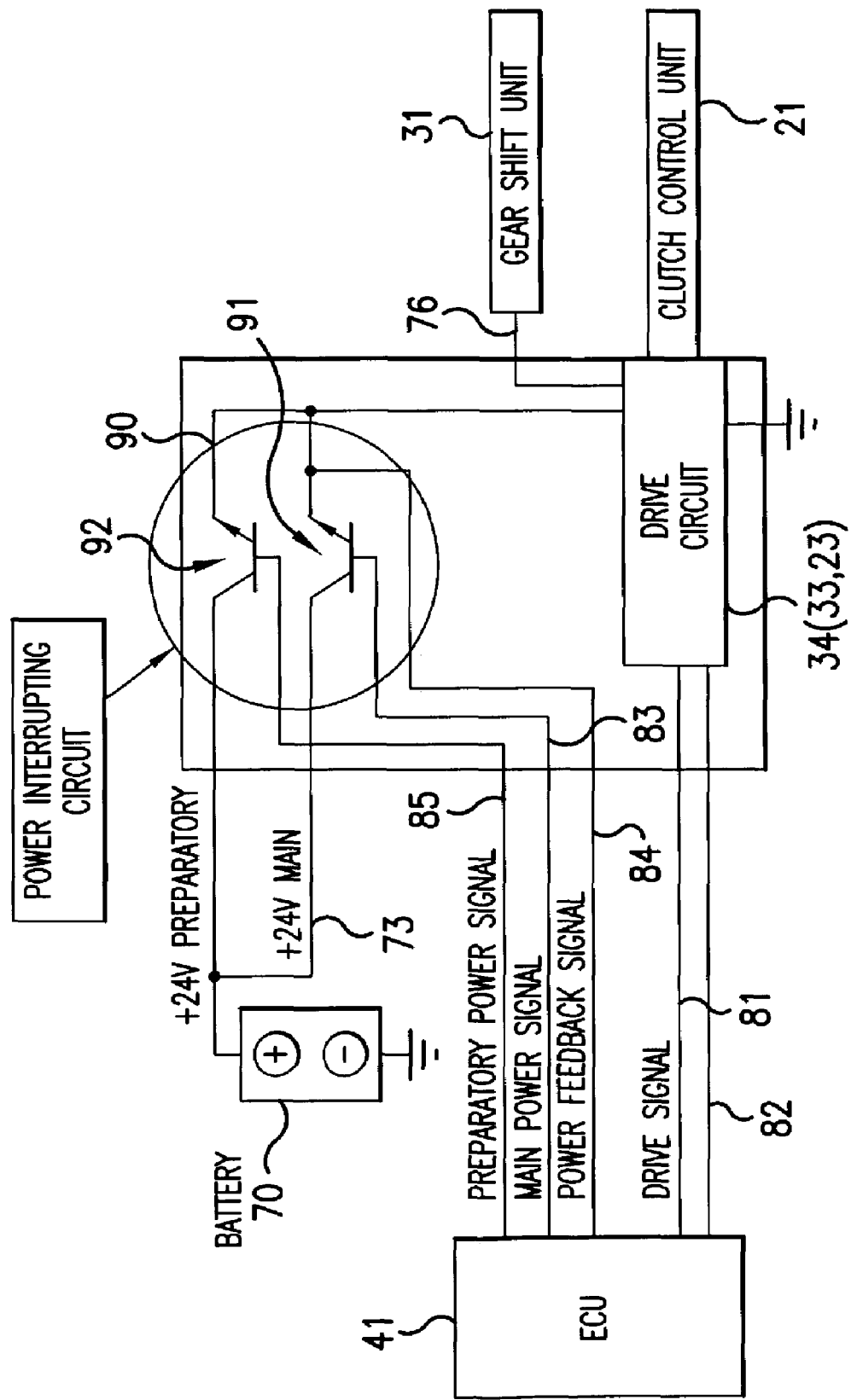
FIG. 5 is a schematic construction diagram showing a control circuit structure of a mechanical-type automatic transmission according to a second embodiment of the invention.

FIG. 5 is a diagram showing a control circuit structure of a mechanical-type automatic transmission according to a second embodiment of the invention, and the same reference numerals as those of FIG. 1 designate the similar components.

In this embodiment, as shown in FIG. 5, the gear-shifting driver circuit 33 and the clutch controlling driver circuit 23 are integrated like in the first embodiment as the integral driver circuit 34. However, this embodiment is different from the first embodiment in that the integral driver circuit 34 is arranged integrally with the clutch control unit 21.

Between the battery 70 and the integral driver circuit 34 and between the integral driver circuit 34 and the gear-shift unit 31, therefore, harnesses (or power feed lines or electric wires) 73 and 76 are provided, respectively. The transistor 91 functioning as a switch is incorporated in the harness 73 between the battery 70 and the integral driver circuit 34, and the preparatory harness (or the preparatory power feed circuit) 90 is wired in parallel with the harness 73. Moreover, the signal line 83 is connected between the ECU 41 and the transistor 91, the signal line 84 is connected between the harness 73 and the ECU 41, and the signal line is connected between the ECU 41 and the transistor 92.

The control circuit structure for the mechanical-type automatic transmission according to the second embodiment of the present invention is constructed as described hereinbefore, so that it can achieve actions and effects similar to those of the first embodiment.

Like in the first embodiment, moreover, the gear-shifting driver circuit 33 and the clutch controlling driver circuit 23 are integrally constructed as the integral driver circuit 34 so that the circuit construction can be made compact.

When the integral driver circuit 34 is attached directly to the gear-shift unit 31, moreover, it is seriously affected by the high temperature or vibration of the engine or transmission so that the driver circuit 34 has to be strictly protected against the high temperature or vibration. However, the clutch control unit 21 can be disposed at a portion such as the chassis or frame where the temperature or vibration is not relatively severe. Therefore, the integral driver circuit 34 need not be strictly protected, when attached directly to the clutch control unit 21, against the high temperature or vibration so that its durability can be retained at a low cost.

Next, a third embodiment of the present invention will be described with reference to the accompanying drawing.

Figure 6:
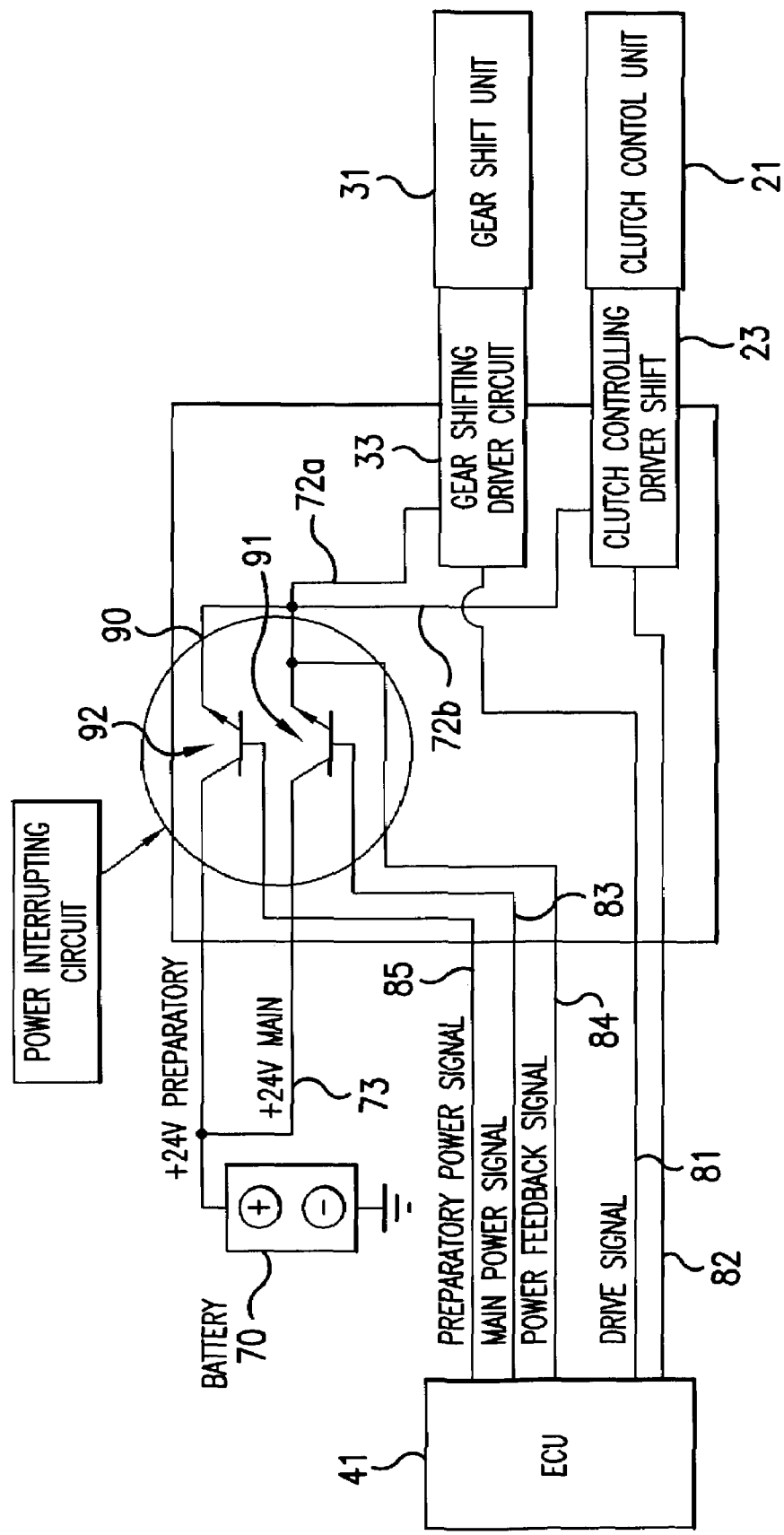
FIG. 6 is a schematic construction diagram showing a control circuit structure of a mechanical-type automatic transmission according to a third embodiment of the invention.
Figure 7:
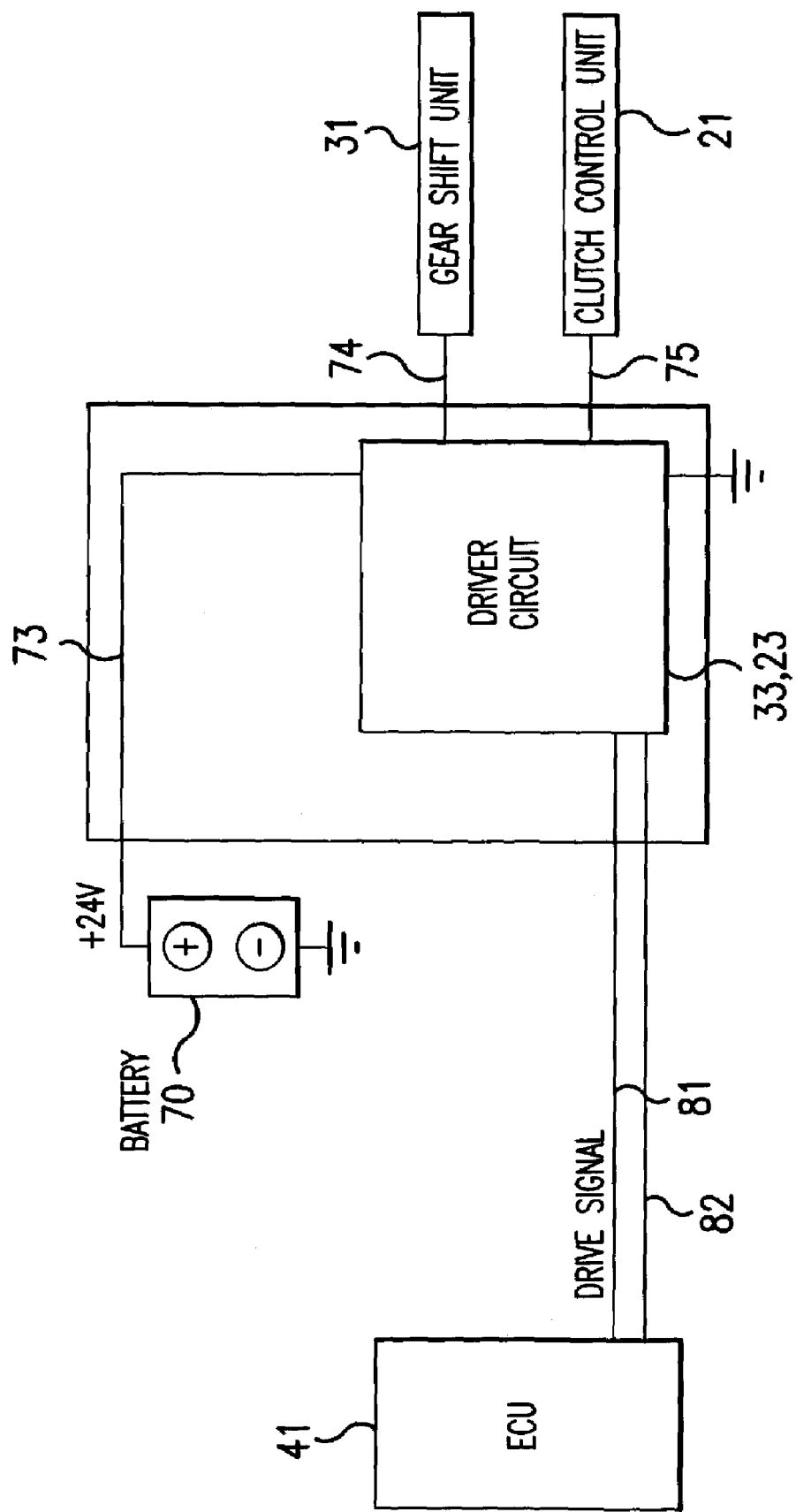
FIG. 7 is a schematic construction diagram showing a conventional control circuit structure of a mechanical-type automatic transmission.

FIG. 6 is a diagram showing a control circuit structure of a mechanical-type automatic transmission according to a third embodiment of the invention, and the same reference numerals as those of FIG. 1 and FIG. 5 designate the similar components.

In this embodiment, as shown in FIG. 6, the gear-shifting driver circuit 33 and the clutch controlling driver circuit 23 are made separate. The gear-shifting driver circuit 33 is attached directly to the gear-shift unit 31, and the clutch controlling driver circuit 23 is attached directly to the clutch control unit 21.

Between the battery 70 and the gear-shifting driver circuit 33 and the clutch controlling driver circuit 23, harnesses (or power feed lines or electric wires) 73, 72a, and 72b are provided. Specifically, the harness 73 is connected at its one end to the battery 70 and is branched at its other end into the harnesses 72a and 72b. The harness 72a is connected to the gear-shifting driver circuit 33 and the harness 72b is connected to the clutch controlling driver circuit 23.

The transistor 91, that functions as a switch, is incorporated in the harness 73, and the preparatory harness (or the preparatory power feed circuit) 90 is provided in parallel with the harness 73. In the harness 90, the transistor 92 is incorporated to function as a switch. Moreover, the signal line 83 is connected between the ECU 41 and the transistor 91, the signal line 84 is connected between the harness 73 and the ECU 41, and the signal line 85 is connected between the ECU 41 and the transistor 92.

The control circuit structure for the mechanical-type automatic transmission according to the third embodiment of the present invention is constructed, as described hereinbefore, so that it can achieve actions and effects similar to those of the first and second embodiments.

Although the present invention has been described in connection with its embodiments, it should not be limited to those embodiments and can be modified in various manners without departing from the gist thereof.

In each of the individual embodiments, for example, the transistor 91 is caused to act as the gear-shifting power interrupting circuit and the clutch controlling power interrupting circuit. In case the gear-shift unit and the clutch control unit have different power feed circuit portions as in the third embodiment, however, each power feed circuit portion may be provided with the transistor (acting as the gear-shifting power interrupting means or the clutch controlling power interrupting means).

In the structure of the third embodiment, moreover, the individual driver circuits 33 and 23 need not be attached directly to the gear-shift unit or the clutch control unit but may be arranged near the gear-shift unit or the clutch control unit.

Moreover, the control circuit stricture of the invention may be applied to the gear-shift unit in which the clutch control unit is constructed without any electric element that demands a large current and in which an electric element demanding a large current is used only for the gear-shift unit.

For the clutch control unit, moreover, an electric actuator such as an electric motor may be used in place of the clutch mechanism 2 actuated by regulating the oil pressure, generated by the electric pump 22, by the control valve 21a.

Moreover, the control circuit structure of the present invention may be applied in various automobiles and not only to a body construction such as a mono-cock vehicle having a cab on the chassis, but also to a structure having the body on the chassis.

The invention claimed is:

1. A control circuit abnormality determining device for a vehicular power transmission apparatus, comprising:
   a power transmission unit for transmitting a driving force of an engine to an output member;
   an actuator for switching operations of said power transmission means;
   a driver circuit for driving said actuator;
   a power supply circuit for supplying an electric power to said driver circuit;
   an interruption unit for interrupting the electric power fed to said driver circuit through said power supply circuit;
   a control unit for selectively outputting an interruption signal to said interruption unit to interrupt supply of the electric power to said driver circuit; and
   an abnormality determining unit for determining failure of said power supply circuit when the electric power is fed to said driver circuit at a time when the interruption signal is being output to said interruption unit or when the electric power is not fed to said driver circuit at a time when the interruption signal is not being output to said interruption unit.

2. A control circuit abnormality determining device of a vehicular power transmission apparatus according to claim 1, further comprising:
   a preparatory circuit provided separately from said power supply circuit for supplying the electric power to said driver circuit,
   said preparatory circuit being adapted to supply the electric power to said driver circuit when said abnormality determining unit determines that the power supply circuit has failed.

3. A control circuit abnormality determining device of a vehicular power transmission apparatus according to claim 1,
   wherein said actuator is a gear-shift unit for an automatic transmission.

4. A control circuit abnormality determining device of a vehicular power transmission apparatus according to claim 1,
   wherein said actuator is a friction clutch actuator interposed between the engine and the output member.

5. A control circuit abnormality determining device of a vehicular power transmission apparatus according to claim 1,
   wherein said control unit outputs said interruption signal when an engine key switch is OFF.

6. A control circuit structure of a vehicular power transmission apparatus, comprising:
   power transmission means for transmitting the driving force of an engine to an output member;
   an actuator for switching operations of said power transmission means;
   a driver circuit for driving said actuator;
   a power supply circuit for supplying an electric power to said driver circuit;
   an interruption unit, provided in said power supply circuit, for interrupting the electric power fed to said driver circuit through said power supply circuit;
   a control unit for selectively outputting interruption signal to said interruption unit to interrupt supply of the electric power to said driver circuit; and
   an abnormality determining unit for determining failure of said power supply circuit when the electric power is fed to said driver circuit at a time when the interruption signal is being output to said interruption unit or when the electric power is not fed to said driver circuit at a time when the interruption signal is not being output to said interruption unit.

7. A control circuit abnormality determining device for a vehicular power transmission apparatus, comprising:
   a driver circuit that drives an actuator for switching operations of a power transmission unit for transmitting a driving force to an output member;
   a power supply circuit for supplying an electric power to said driver circuit;
   an interruption unit, provided in said power supply circuit, for selectively interrupts the electric power supplied to said driver circuit through said power supply circuit;
   a power feedback unit that detects whether or not the electric power is being supplied to said driver circuit;
   a control unit that selectively outputs an interruption signal to said interruption unit to interrupt supply of the electric power to said driver circuit; and
   an abnormality determining unit that determines a failure of said driver circuit when the power feedback unit detects that the electric power is fed to said driver circuit at a time when the interruption signal is being output to said interruption means or when the power feedback unit detects that the electric power is not fed to said driver circuit at a time when the interruption signal is not being output to said interruption means.

8. A control circuit abnormality determining device for a vehicular power transmission apparatus that transmits a driving force to an output member, comprising:
- a driver circuit for driving an actuator for operating the vehicular power transmission apparatus;
- a power supply circuit for supplying an electric power to said driver circuit;
- a first interruption unit for interrupting the electric power supplied to said driver circuit through said power supply circuit;
- a control unit for selectively outputting a first interruption signal to said first interruption unit to interrupt supply of the electric power to said driver circuit; and
- an abnormality determining unit for determining failure of said power supply circuit when the electric power is fed to said driver circuit at a time when the first interruption signal is being output to said first interruption unit or when the electric power is not fed to said driver circuit at a time when the first interruption signal is not being output to said first interruption unit.

9. The control circuit abnormality determining device according to claim 8, further comprising:
- a preparatory circuit provided separately from said power supply circuit for supplying the electric power to said driver circuit, said preparatory circuit being adapted to supply the electric power to said driver circuit when said abnormality determining means determines that the power supply circuit has failed.

10. The control circuit abnormality determining device according to claim 9, further comprising:
- a second interruption unit for interrupting supply of the electric power to said driver circuit through said preparatory circuit,
- wherein said control unit outputs a second interruption signal to allow the electric power to be supplied to said driver circuit only when said abnormality determining unit determines that said power supply circuit has failed.

11. The control circuit abnormality determining device according to claim 8, further comprising:
- a power feedback unit that detects whether or not the electric power is being supplied to said driver circuit,
- wherein said abnormality determining unit determines failure of said driver circuit when the power feedback unit detects that the electric power is fed to said driver circuit at the time when the first interruption signal is being output to said interruption means or when the power feedback unit detects that the electric power is not fed to said driver circuit at the time when the first interruption signal is not being output to said interruption means.

* * * * *